US008485546B2

(12) United States Patent
Li et al.

(10) Patent No.: US 8,485,546 B2
(45) Date of Patent: Jul. 16, 2013

(54) FOLDABLE BABY STROLLER FRAME

(75) Inventors: Wei-Yeh Li, Tainan County (TW); Kuang-Neng Cheng, Chiayi County (TW)

(73) Assignee: Lerado (Zhong Shan) Industrial Co., Ltd., Zhong Shan, Guang Dong Province (CN)

(*) Notice: Subject to any disclaimer, the term of this patent is extended or adjusted under 35 U.S.C. 154(b) by 363 days.

(21) Appl. No.: 12/845,636

(22) Filed: Jul. 28, 2010

(65) Prior Publication Data

US 2010/0308550 A1 Dec. 9, 2010

Related U.S. Application Data

(63) Continuation-in-part of application No. 11/851,632, filed on Sep. 7, 2007, now Pat. No. 7,766,366.

(30) Foreign Application Priority Data

Sep. 8, 2006 (TW) .................................. 095216069

(51) Int. Cl.
*B62B 7/06* (2006.01)
(52) U.S. Cl.
USPC ........................... 280/642; 280/647; 280/650
(58) Field of Classification Search
USPC .................................. 280/547–650, 657, 658
See application file for complete search history.

(56) References Cited

U.S. PATENT DOCUMENTS

| 2,842,374 | A  |   | 7/1958  | Benson et al. |          |
|-----------|----|---|---------|---------------|----------|
| 4,544,178 | A  | * | 10/1985 | Al-Sheikh et al. | 280/642 |
| 5,348,336 | A  | * | 9/1994  | Fernie et al. | 280/641 |
| 6,220,620 | B1 | * | 4/2001  | Harroun | 280/650 |
| 6,237,995 | B1 | * | 5/2001  | Dierickx | 297/130 |
| 6,241,275 | B1 | * | 6/2001  | Slagerman | 280/650 |
| 6,357,784 | B1 |   | 3/2002  | Mitzman |          |
| 6,513,827 | B1 | * | 2/2003  | Barenbrug | 280/648 |
| 6,779,804 | B1 | * | 8/2004  | Liu | 280/47.38 |
| 7,118,121 | B2 |   | 10/2006 | Cheng et al. |      |
| 7,267,359 | B1 |   | 9/2007  | Yang et al. |        |
| 7,367,581 | B2 |   | 5/2008  | Yang |               |
| 7,441,794 | B2 |   | 10/2008 | Lan |                |

(Continued)

FOREIGN PATENT DOCUMENTS

| DE | 10132019 A1 | 1/2003 |
| EP | 0522783 A2 | 1/1993 |
| EP | 1764281 A2 | 3/2007 |
| WO | WO 2005/054031 | * 6/2005 |

*Primary Examiner* — Katy M Ebner

(74) *Attorney, Agent, or Firm* — Morris Manning & Martin, LLP; Tim Tingkang Xia, Esq.

(57) ABSTRACT

The foldable baby stroller frame comprises a collapsible wheeled frame, a foldable upper frame, and at least a release mechanism. The collapsible wheeled frame comprises at least a front strut, a pair of rear struts and a lockable swivel base. The lockable swivel base is pivotally connected with the front strut and the rear strut, including a spring-loaded abutting slider for fixing the front strut and the rear strut in a using position. The release mechanism is manipulated by rotating a pair of push arms, when the push arms is rotated upwardly to a upright position, the spring-loaded positioning member is disengaged to permit the foldable upper frame changing its direction, and when the push arms is rotated downwardly, the spring-loaded abutting slider is refracted to permit the front strut and the rear strut rotating relative to each other.

17 Claims, 16 Drawing Sheets

U.S. PATENT DOCUMENTS

| | | |
|---|---|---|
| 7,527,283 B2 | 5/2009 | Horacek |
| 7,591,479 B2 * | 9/2009 | Golias .......................... 280/647 |
| 7,607,725 B2 * | 10/2009 | Dickie et al. .................... 297/45 |
| 7,753,398 B2 * | 7/2010 | Yang ............................. 280/642 |
| 2003/0025300 A1 * | 2/2003 | Maxisch ....................... 280/642 |
| 2005/0098983 A1 | 5/2005 | Cheng et al. |
| 2006/0255564 A1 * | 11/2006 | Ayre ............................. 280/642 |
| 2007/0096434 A1 * | 5/2007 | Haeggberg ................... 280/642 |

\* cited by examiner

FOLDABLE BABY STROLLER FRAME

CROSS-REFERENCE TO RELATED APPLICATIONS

This application is a continuation-in-part of U.S. patent application Ser. No. 11/851,632 filed on Sep. 7, 2007, entitled "FOLDABLE BABY STROLLER FRAME", the disclosure of which is incorporated by reference herein.

FIELD OF THE INVENTION

This invention relates to a foldable stroller frame. More specifically, this invention relates to a stroller that has a collapsible wheeled frame having a lockable swivel base for pivotally supporting a foldable upper frame, and a release mechanism mounted on the foldable upper frame for actuating the folding of the collapsible wheeled frame and the foldable upper frame.

DESCRIPTION OF THE RELATED ART

Traditional collapsible stroller frame normally has a pair of articulated joints disposed on opposite sides of the frame for pivotally connecting the push arms and the front struts thereof.

As shown in FIG. 12, the articulated joint 9 used to connect the push arm 91 and the front strut 93, typically includes an upper joint member 92 and a lower joint member 94. The push arm 91 is connected the upper joint member 92 and has a distal portion pivotally connected to the lower joint member 94.

The lower joint member 94 is connected with the front strut 93 and has a slot 941 formed at the upper side thereof. A connecting member 911, latch member 912 and a spring 910 are movably mounted inside the lower end of the push arm 91. When the push arm 91 is rotated about the lower joint member 94 to aligned to the front strut 93, the spring 910 is functioning to bias the latch member 912 to engage with the slot 941, so as to lock the articulated joint 9 in a non-rotatable state thereby to keep the push arm 91 and the front strut 93 in an erected position.

When folding the collapsible stroller frame, the user may pull the latch member 912 backwardly through the connecting member 91 against the biasing of the spring 910 to unlock the articulated joint 9, this made the push arm 91 is then rotatable, therefore, the traditional collapsible stroller frame is foldable for saving space of storage and transportation.

As the lower joint member 94 of the articulated joint 9 is made of plastic material, in case the slot 941 is broken, the stroll may accidentally become folded in use, this shall endanger the baby passenger sitting inside.

SUMMARY OF THE INVENTION

In order to avoid the possible danger of the traditional collapsible stroller frame, the present invention provides a foldable baby stroller frame with a different folding mechanism.

The foldable baby stroller frame according to the present invention comprises a collapsible wheeled frame, a foldable upper frame, and at least a release mechanism.

The collapsible wheeled frame comprises at least a front strut, a pair of rear struts and a lockable swivel base.

The lockable swivel base is pivotally connected with the front strut and the rear strut, including a spring-loaded abutting slider for fixing the front strut and the rear strut in a using position.

Preferably, a spring-loaded positioning member is installed for releasably engaging between the foldable upper frame and the lockable swivel base to fix the direction of the foldable upper frame.

The release mechanism is manipulated by rotating a pair of push arms, when the push arms is rotated upwardly to a upright position, the spring-loaded positioning member is disengaged to permit the foldable upper frame changing its direction, and when the push arms is rotated downwardly, the spring-loaded abutting slider is retracted to permit the front strut and the rear strut rotating relative to each other.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings, which are given by way of illustration only, and thus are not limitative of the present invention, and wherein.

DETAILED DESCRIPTION OF THE PREFERRED EMBODIMENTS

Reference will now be made in detail to presently preferred embodiments of the invention, examples of which are illustrated in the accompanying drawings. An effort has been made to use the same reference numbers throughout the drawings to refer to the same or like parts.

Figure 1:
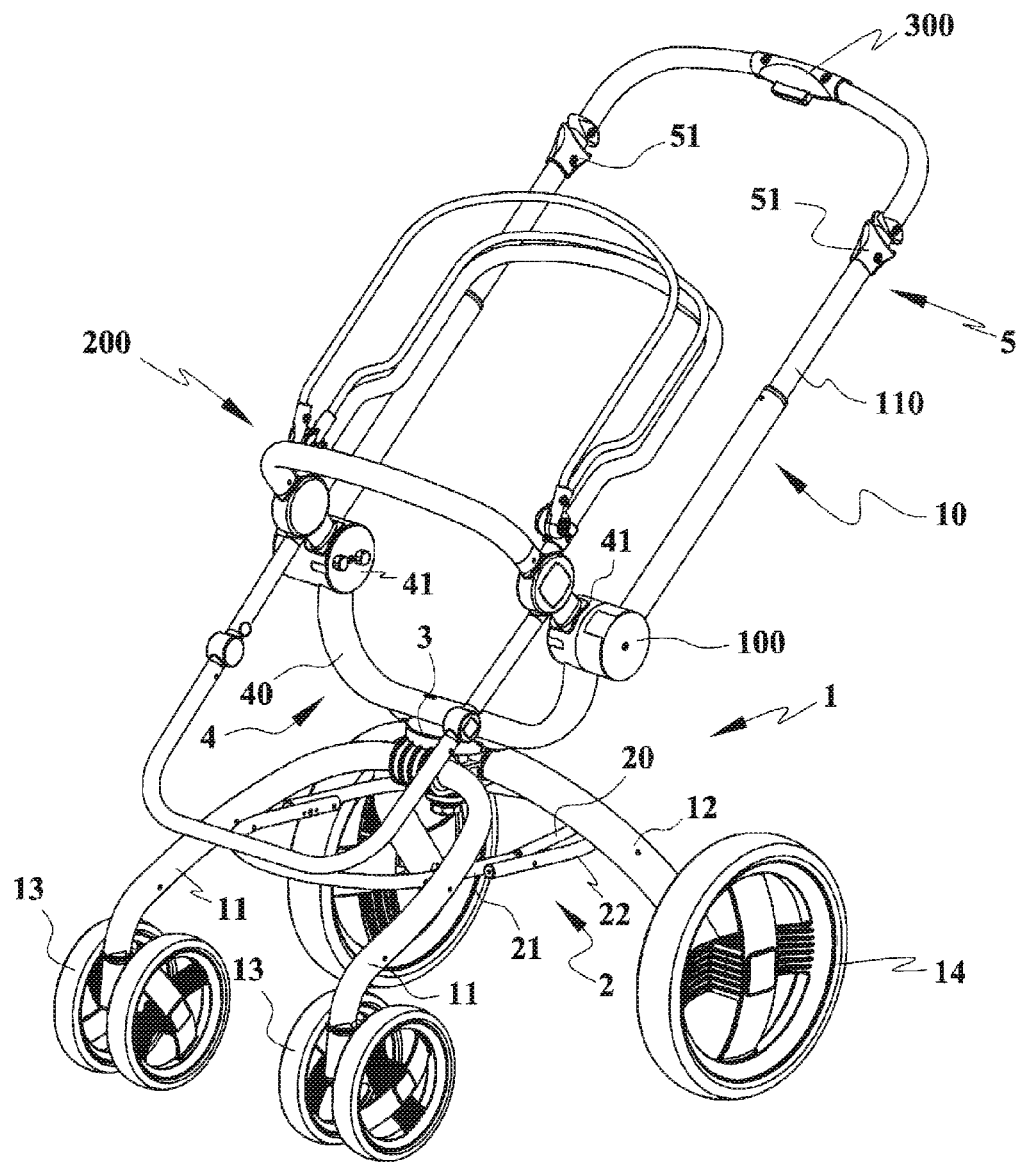
FIG. 1 is a perspective view of a preferred embodiment of the collapsible baby stroller frame of the present invention.
Figure 2:
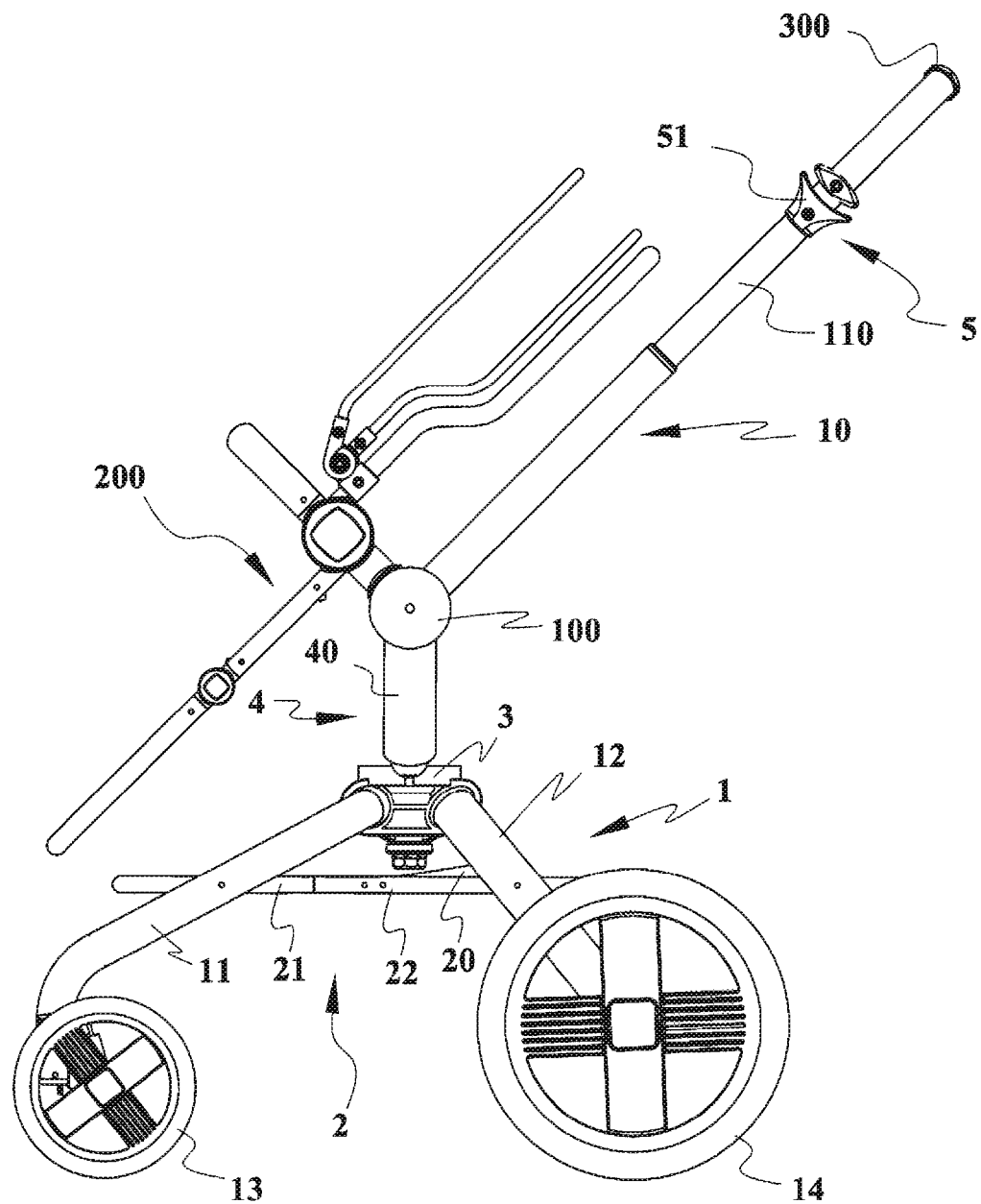
FIG. 2 is a side view of the collapsible baby stroller frame of FIG. 1.
Figure 3:
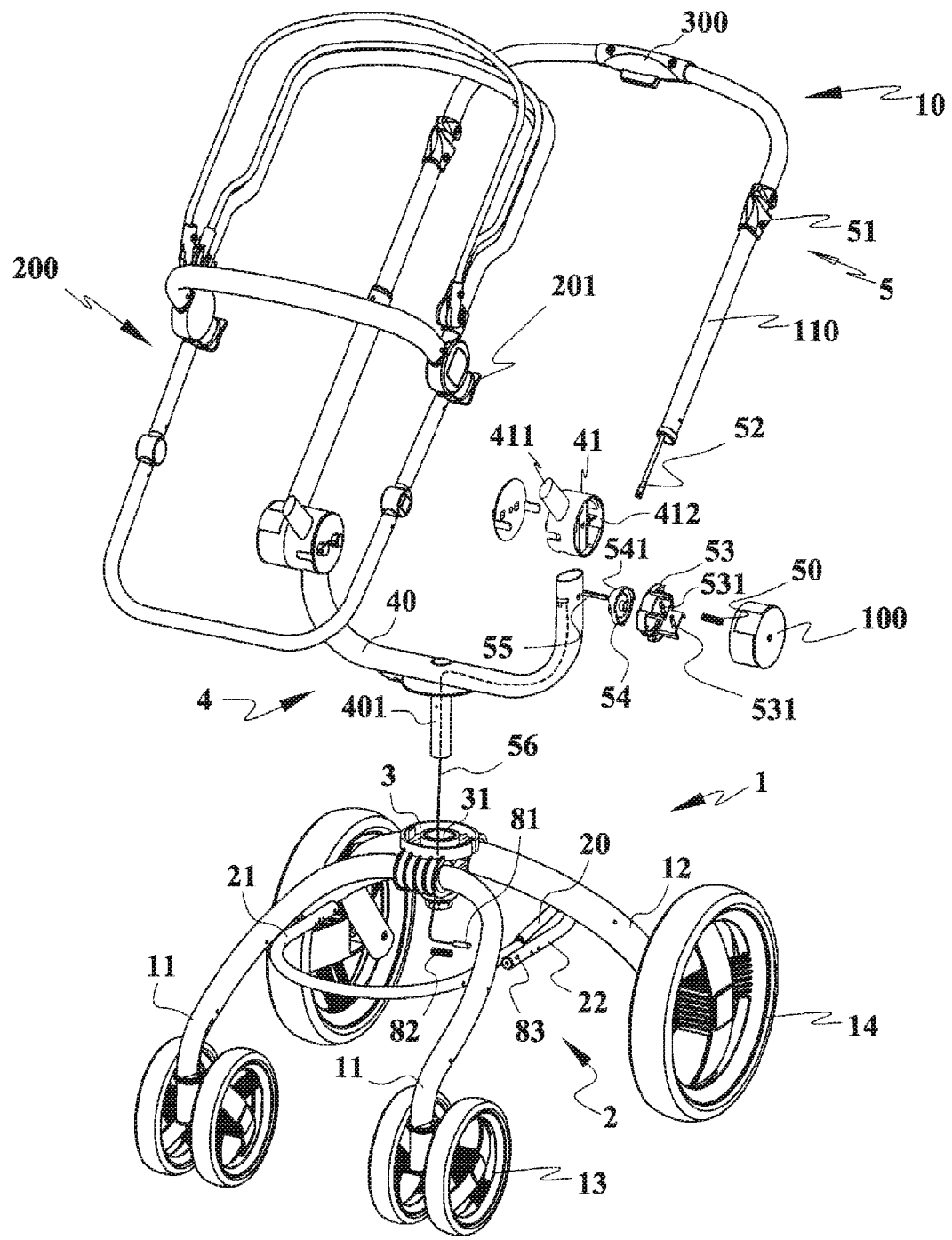
FIG. 3 is a partially exploded perspective view of the collapsible baby stroller frame according to the preferred embodiment.

Referring to FIGS. 1 and 3, a preferred embodiment of the collapsible baby stroller frame according to the present invention comprises a collapsible wheeled frame 1, a foldable upper frame 10, and at least a release mechanism 5.

The collapsible wheeled frame 1 comprises at least a front strut 11 with castor wheels 13, a pair of rear struts 12 with rear wheels 14, a pair of lockable articulated arms 2, and a swivel base 3.

The swivel base 3 is pivotally connected with the front strut 11 and the rear struts 12, and further has a vertical shaft hole 31 for pivotally connecting and supporting the foldable upper frame 10.

The pair of lockable articulated arms 2 is pivotally connected between the front strut 11 and the rear struts 12, and has a locked position for keeping the collapsible wheeled frame 1 in an un-foldable state and a foldable position for folding the collapsible wheeled frame 1.

The release mechanism 5 is operatively mounted on the foldable upper frame 10 and associates with the pair of lockable articulated arms 2 via a connecting member 56 for actuating the folding of the collapsible wheeled frame 1 and the foldable upper frame 10.

The foldable upper frame 10 includes a swivel rack 4, a push arm 110, and a pair of joints 100. The pair of joints 100 are lockable and pivotable connect between the swivel rack 4 and the push arm 110.

Preferably, the collapsible wheeled frame 1 may further comprise a biasing member 20 which can be embodied as a pneumatic rod or resilient member for biasing and helping the folding the pair of lockable articulated arms. The biasing member 20 has one end pivoted to the rear strut 12, and another end pivot to the middle portion of the pair of lockable articulated arms 2.

Figure 5:
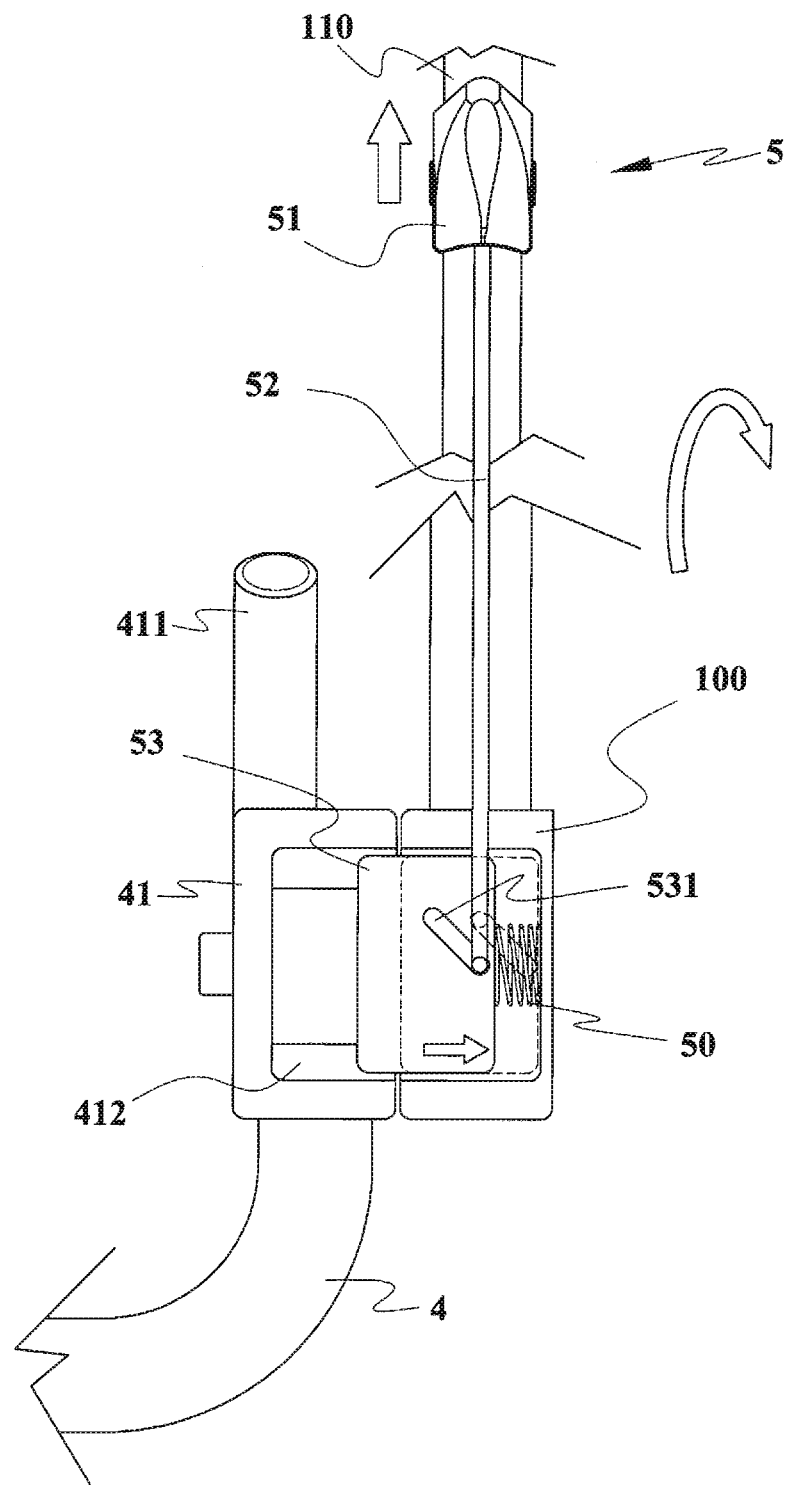
FIG. 5 is a partially cross-sectional view of joint of the foldable upper frame according to the preferred embodiment.

Referring to FIGS. 3 and 5, the swivel rack 4 includes a U-shaped arm 40, a vertical shaft 401, and a pair of mounts 41. The pair of mounts 41 are mounted on the distal ends of the U-shaped arm 40 and have a connecting member 411 for detachably connecting and supporting a seat frame member 200 or a baby carrier (not shown). For instance, the connecting member 411 may be a plug extending upwardly from each of the mounts 41, and the seat frame member 200 or a baby carrier may include a pair of sockets 201 for detachable engaging with the connecting member 411.

The vertical shaft 401 of the swivel rack 4 is connected on the middle portion of the U-shaped arm 40 and extended downwardly for pivotally mounted on the vertical shaft hole 31. This allows caregivers to change the direction of the seat frame member 200 or the baby carrier by turning the swivel rack 4.

The release mechanism 5 is operatively mounted on the foldable upper frame 10 and associates with the pair of lockable articulated arms 2 so as to actuate the folding of the collapsible wheeled frame 1 and the foldable upper frame 10.

Preferably, the release mechanism 5 may include resilient member 50, release actuator 51, an upper flexible connecting member 52, a driving member 53, a driven member 54, a slider 55, and a lower flexible connecting member 56.

The release actuator 51 is slidably mounted on the push arm 110 and associated with the driving member 53 via the upper flexible connecting member 52. The upper flexible connecting member 52 is threaded through the push arm 110 and has a lower end which is slidably engaged with a skewed guiding slot 531 formed in the driving member 53.

The slidable driving member 51 is slidably mounted on the push arm 110 and associated with the driving member 53 via the first connecting member 52. The first connecting member 52 is threaded through the push arm 110 and has a lower end which is slidably engaged with a skewed guiding slot 531 formed in the driving member 53.

Each joint 100 may pivotally couple with the mount 41 and forming a space for receiving the resilient member 50, the driving member 53, and the driven member 54. The driving member 53 has a skewed guiding slot 531, and has an out side for slidably engaging between the mount 41 and the joint 100 in a locked position.

Referring to the FIG. 5, the inner periphery of the mount 41 is formed with a plurality of positioning slots 412 for selectively engaging with the outside of the driving member 53. The driving member 53 is biased by the resilient member 50 and kept in the locked position thereby to lock the joint 100 in an un-rotatable position.

When the upper flexible connecting member 52 is pulled upwardly by the slidable driving member release actuator 51, the end portion of the upper flexible connecting member 52 is sliding along the skewed guiding slot 531, the forces the driving member 53 moving against the biasing of the resilient member 50 thereby to disengage from the positioning slots 412, so as to unlock the joint 100. While the joint 100 is unlocked, the push arm 110 is freely to rotate either upwardly or downwardly.

Figure 4:
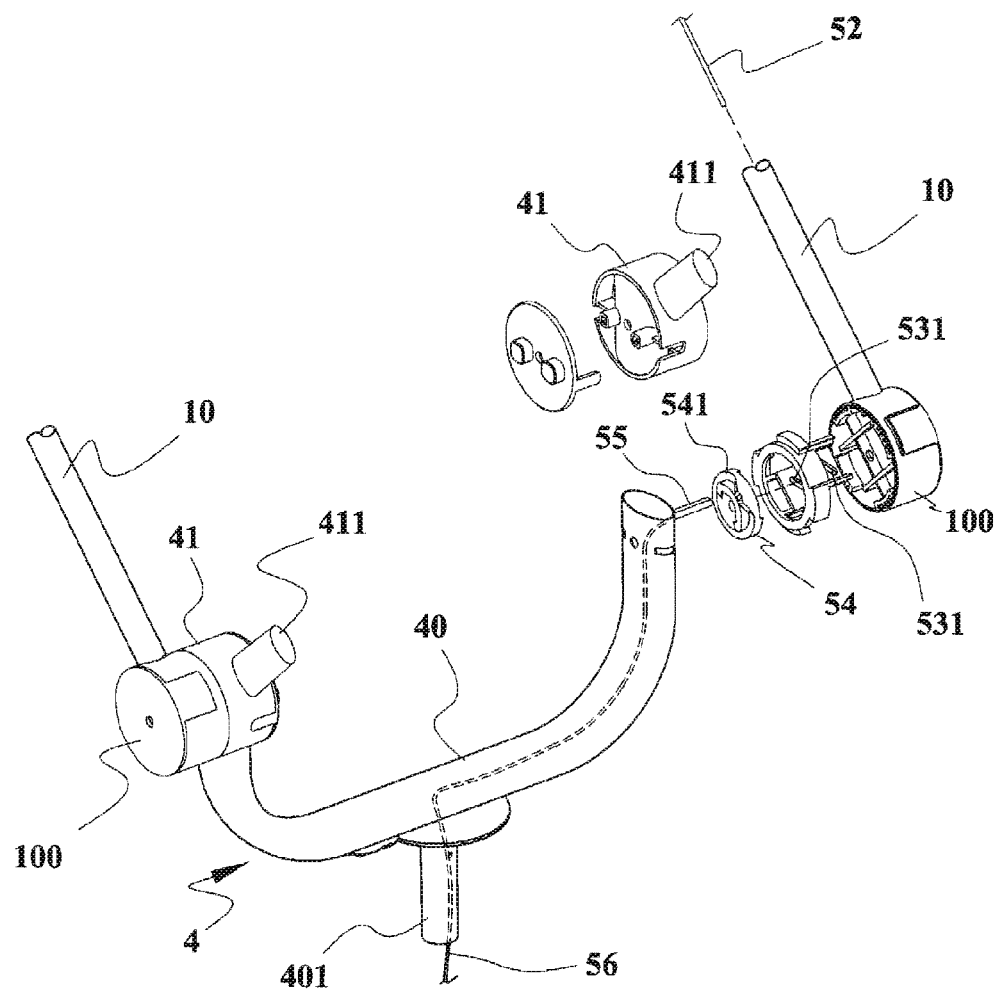
FIG. 4 is a partially exploded perspective view of a foldable upper frame according to the preferred embodiment.
Figure 6:
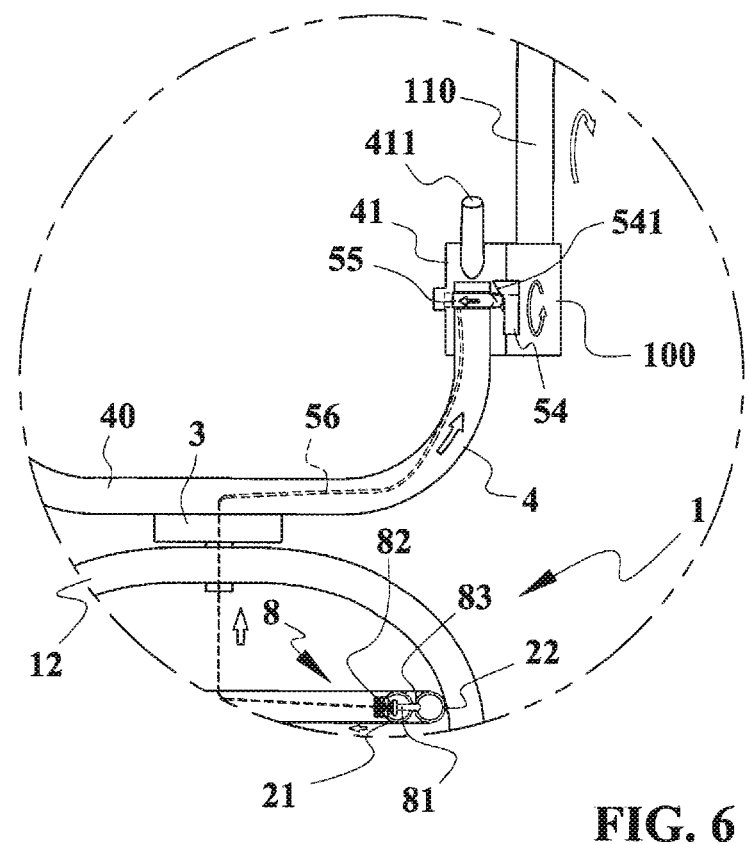
FIG. 6 is a partially schematic cross-sectional view showing the connecting of the collapsible wheeled frame and the foldable upper frame according to the preferred embodiment.

Referring to the FIGS. 3, 4 and 6, the driven member 54 has one side un-rotatably and retractably engaged with the driving member 53 and another side formed with a ramp 541. The slider 55 is movably received in the mount 41 and passes through the upper end of the U-shaped arm 40.

The slider 55 has one end kept slidably abutted on the ramp 541 by a resilient member (not shown), and another end connected with the lower flexible connecting member 56. When the joint 100 is unlocked, the driven member 54 is following the rotation of the push arm 110 and the driving member 53, and then the ramp 541 of the driven member 54 drives the slider 55 to move in a direction of pulling the lower flexible connecting member 56 upwardly to unlock the pair of lockable articulated arms 2.

Figure 7:
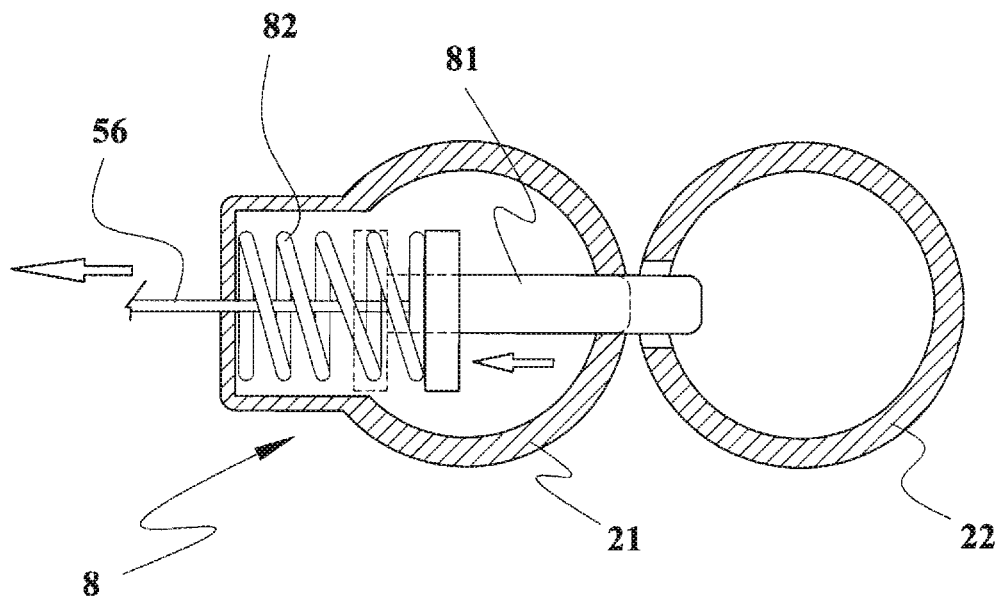
FIG. 7 is a schematic cross-sectional view showing the locking mechanism of the pair of lockable articulated arms according to the preferred embodiment.
Figure 8:
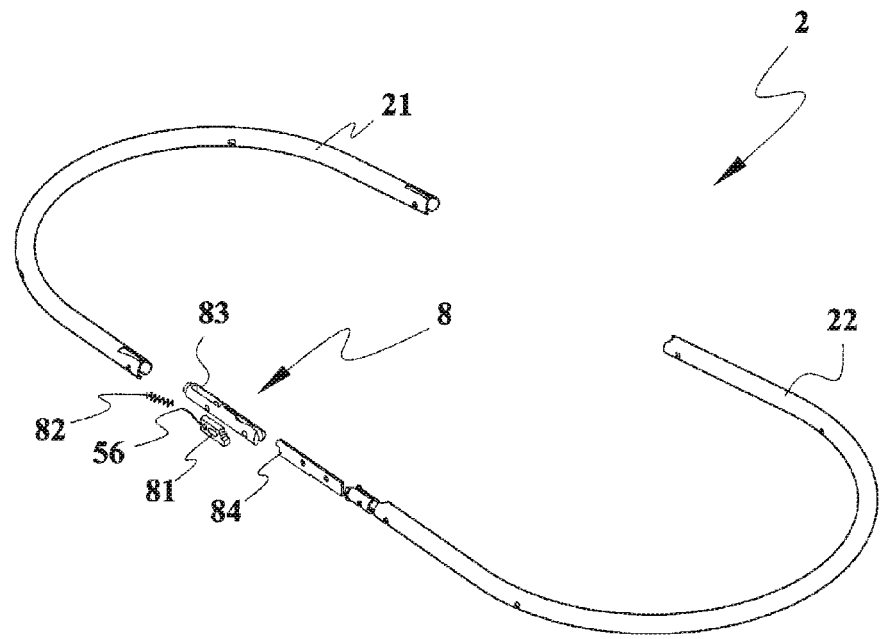
FIG. 8 is an exploded perspective view of the pair of lockable articulated arms of the collapsible baby stroller frame according to the preferred embodiment.

Referring to the FIG. 7, the pair of lockable articulated arms 2 includes a front arm 21, a rear arm 22, and a lockable joint 8. The lockable joint 8 is pivotally connected the front arm 21 and the rear arm 22 and has locked position for preventing the rotation therebetween.

The lockable joint 8 may simply comprises a latch member 81 and a resilient member 82. The latch member 81 is operatively mounted in the front arm 21 and has one end connect with the lower flexible connecting member 56 and biased by the resilient member 82 to latch the rear arm 22 with the opposite end thereof. When the lower flexible connecting member 56 is pulled upwardly, the latch member 81 is driven to unlatch the rear arm 22, and thereby to unlock the pair of lockable articulated arms 2 into a rotatable position.

Alternatively, the lockable joint 8 may further to embody with a first joint member 83 and a second joint member 84 pivotally connected the first joint member 83, using the first joint member 83 to connect with the front arm 21, and using the second joint member 84 to connect the rear arm 22. The latch member 81 may retractably mounted in the first joint member 83 and configured to be engagable with the second joint member 84. When the lower flexible connecting member 56 is pulled upwardly, the latch member 81 is driven to disengage from the second joint member 84, so as unlocks the pair of lockable articulated arms 2.

Figure 9:
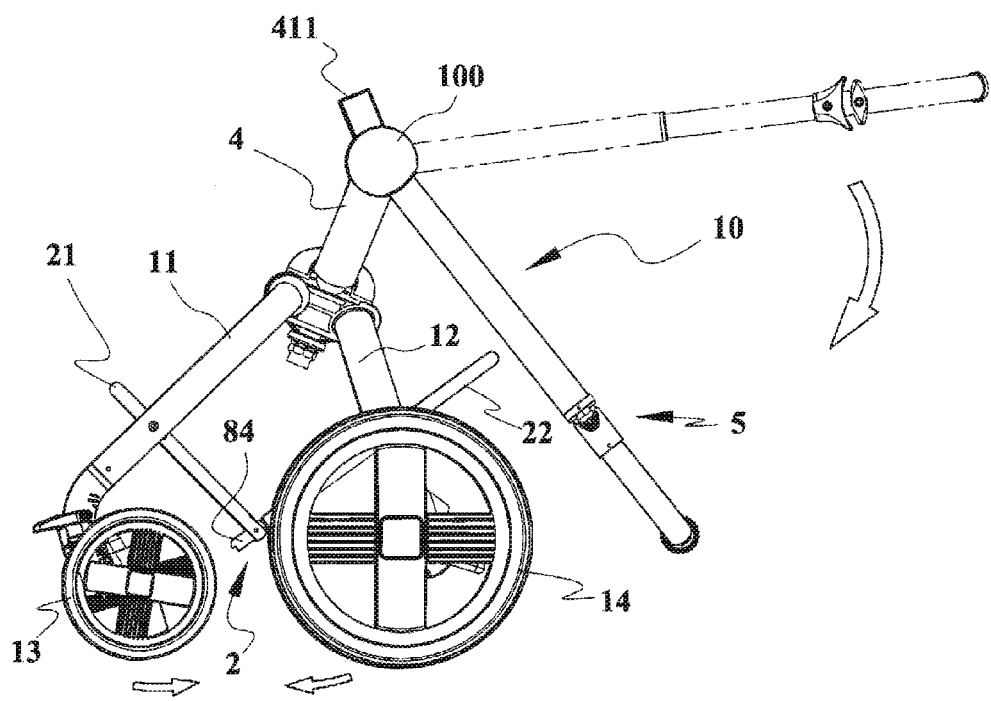
FIG. 9 is a side view illustrating the folding operation of the collapsible baby stroller frame according to the preferred embodiment.
Figure 10:
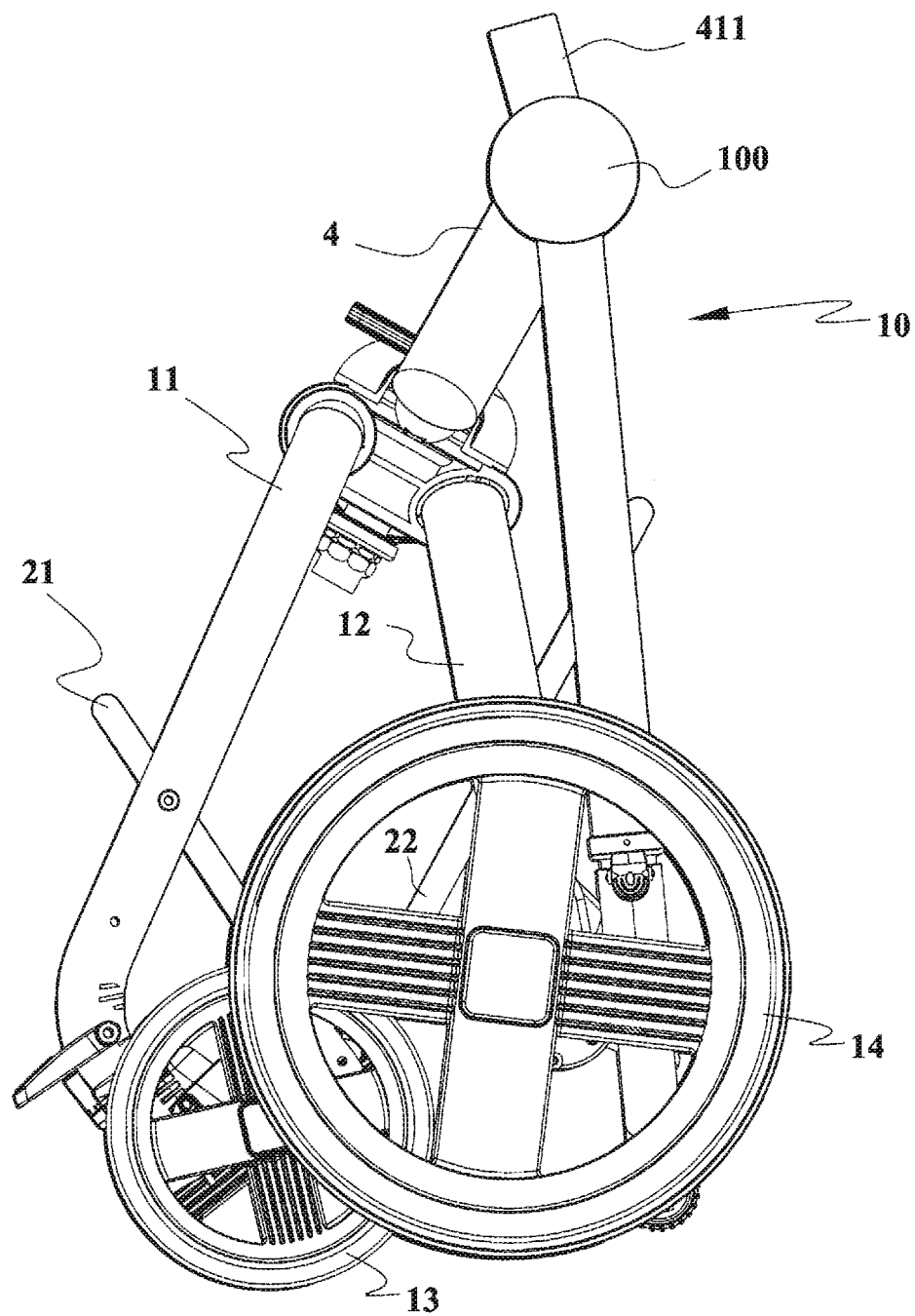
FIG. 10 is a side view illustrating the collapsible baby stroller frame in a folded position after the folding operation.

Referring to the FIG. 9, the front arm 21 is pivoted with the front strut 11, and the rear arm 22 is pivoted with the rear strut 12. When lockable joint 8 is kept in the locked position, the collapsible wheeled frame is kept in an erected position; however, when the joint 100 is unlocked, the push arm 110 can be rotate downwardly, this causes the lower flexible connecting member 56 to unlock the pair of lockable articulated arms 2, so as to allow the front strut 11 and the rear strut 12 to rotate to close to each other as shown in the FIG. 10.

Figure 11:
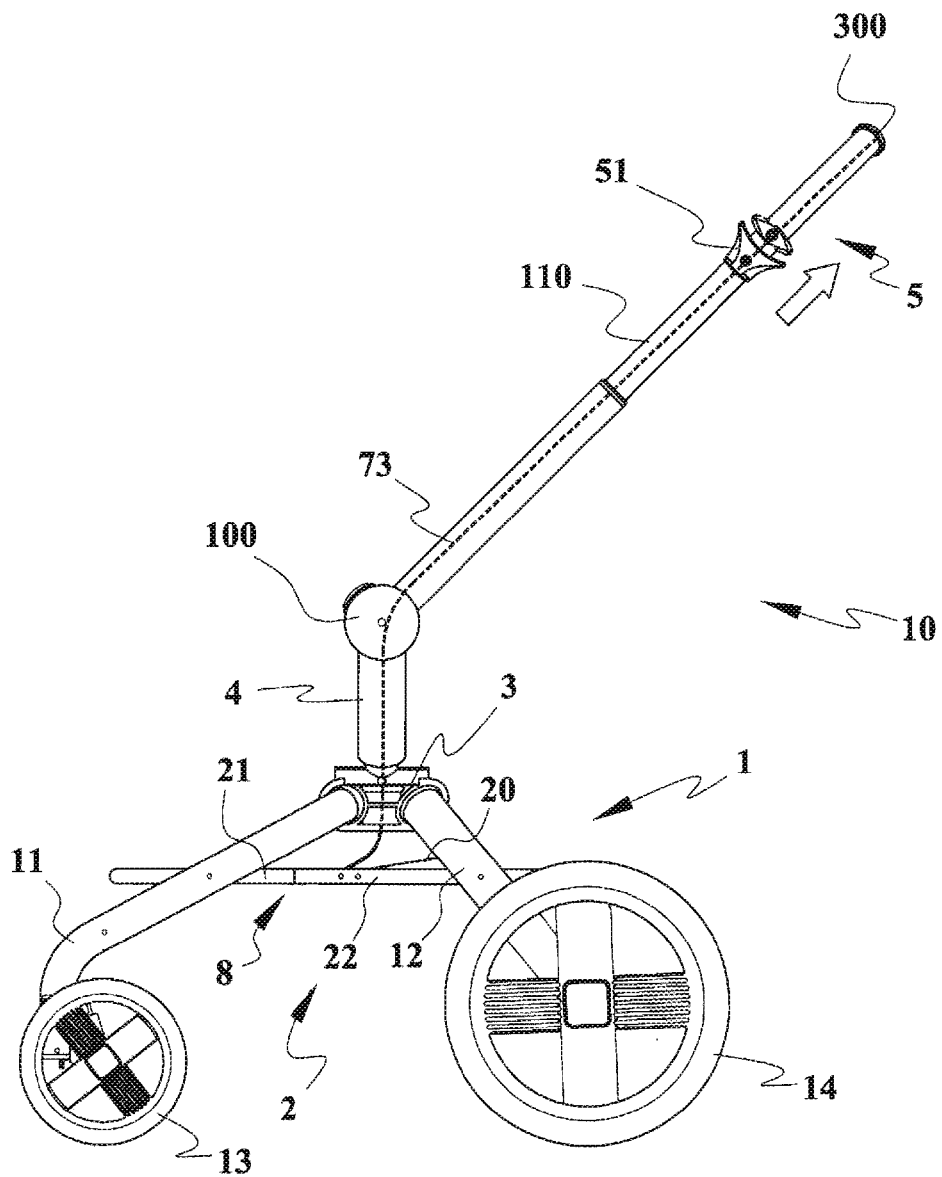
FIG. 11 is a schematic side view showing the operation of the collapsible baby stroller frame according to the preferred embodiment.
Figure 12:
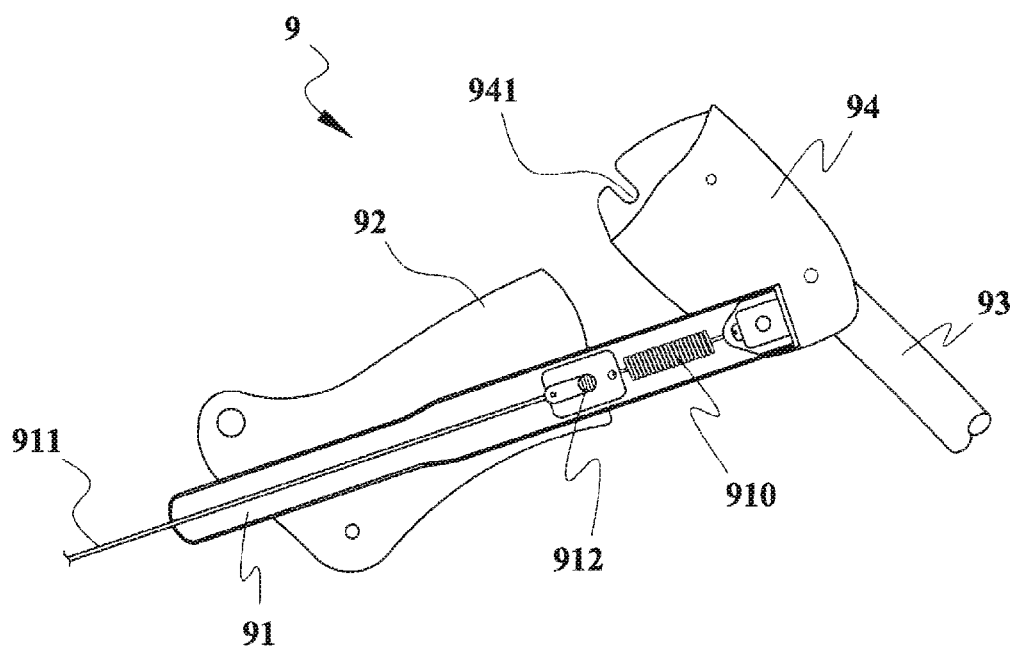
FIG. 12 is schematic cross-sectional view showing an articulated joint of traditional collapsible stroller frame.

Referring to the FIG. 11, the latch member 81 is alternatively connected with the upper flexible connecting member 52 that can be driven by either the release actuator 51 or a one-hand controllable folding actuator as disclosed in U.S. Pat. No. 6,443,479.

Figure 13:
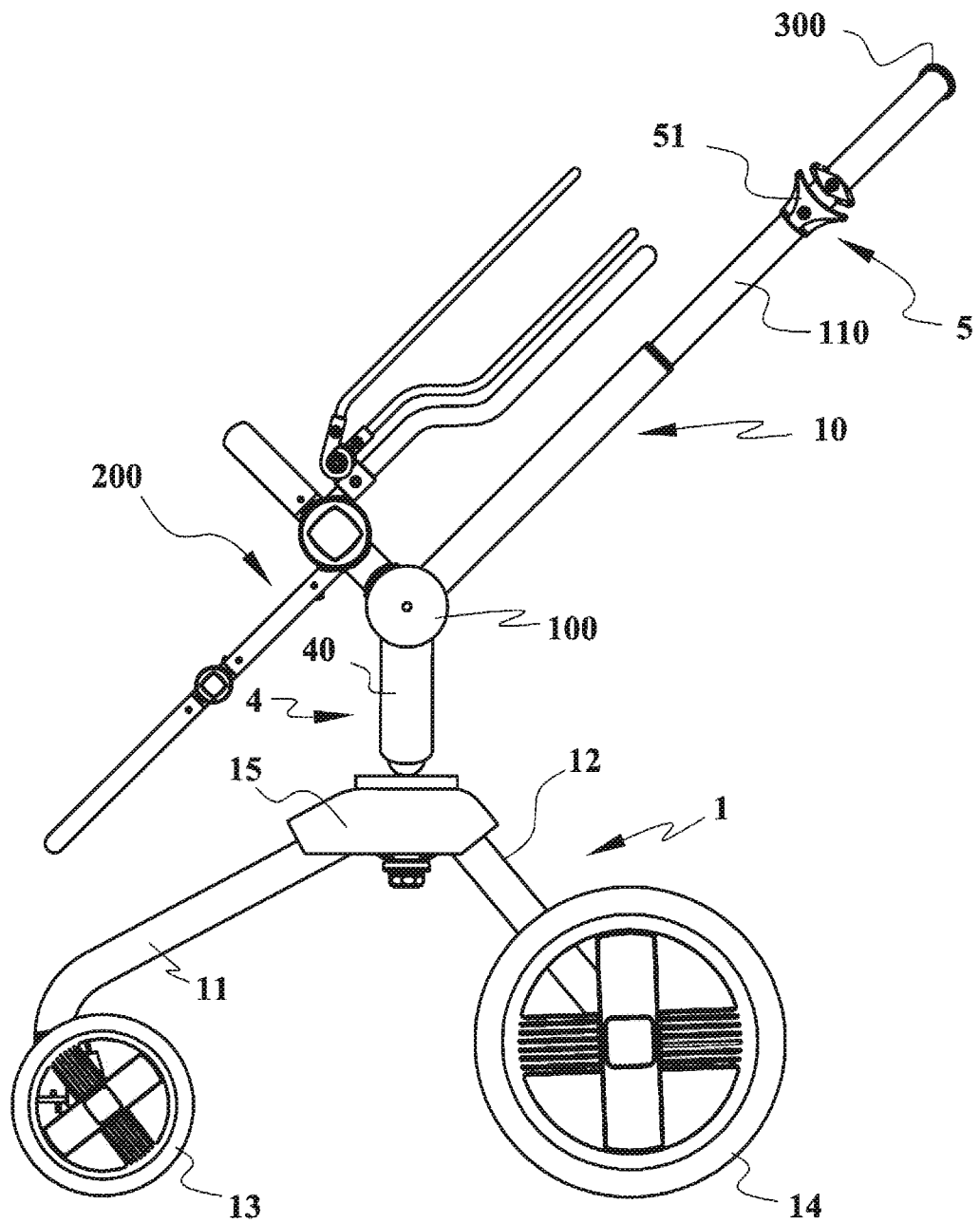
FIG. 13 is a side view illustrating an alternative embodiment of the collapsible baby stroller frame equipped with lockable swivel base.
Figure 14:
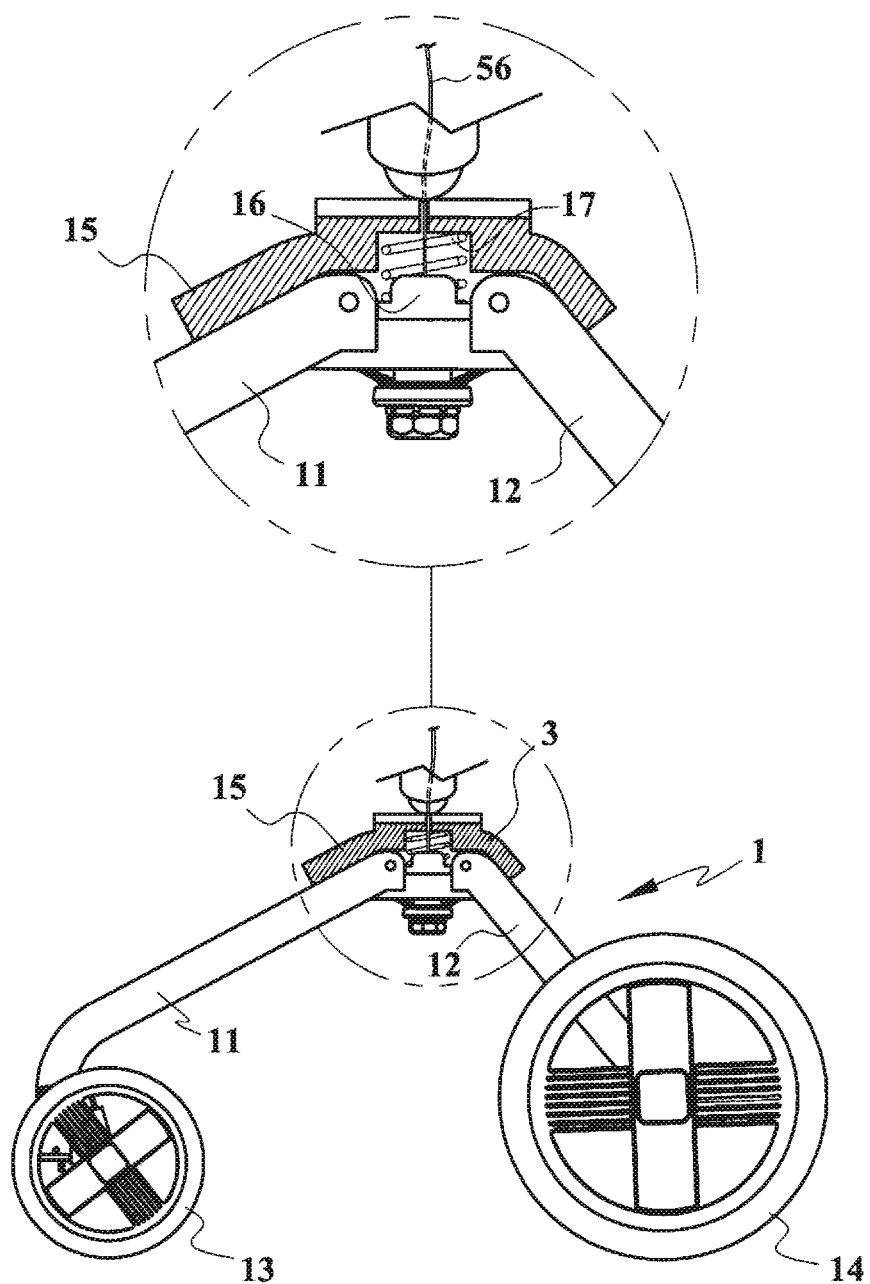
FIG. 14 is a partial cross-sectional view illustrating the assembly of the lockable swivel base and the collapsible wheeled frame.

Referring to FIGS. 13 and 14, an alternative embodiment of the collapsible wheeled frame 1 may comprise at least a front strut 11, a pair of rear struts 12, and a lockable swivel base 15 pivotally connected with the front strut 11 and the rear struts 12. The lockable swivel base 15 includes an abutting slider 16 biased by a resilient member 17 to block the rotation path of the front strut 11 and the rear struts 12 thereby to fix the front strut 11 and the rear struts 12 in a using configuration.

A foldable upper frame 10 is pivotally connected and supported by the lockable swivel base 15. The foldable upper frame 10 may include a swivel rack 4, a push arm 110, and a pair of joints 100. The pair of joints 100 are lockable and pivotably connect between the swivel rack 4 and the push arm 110.

Figure 15:
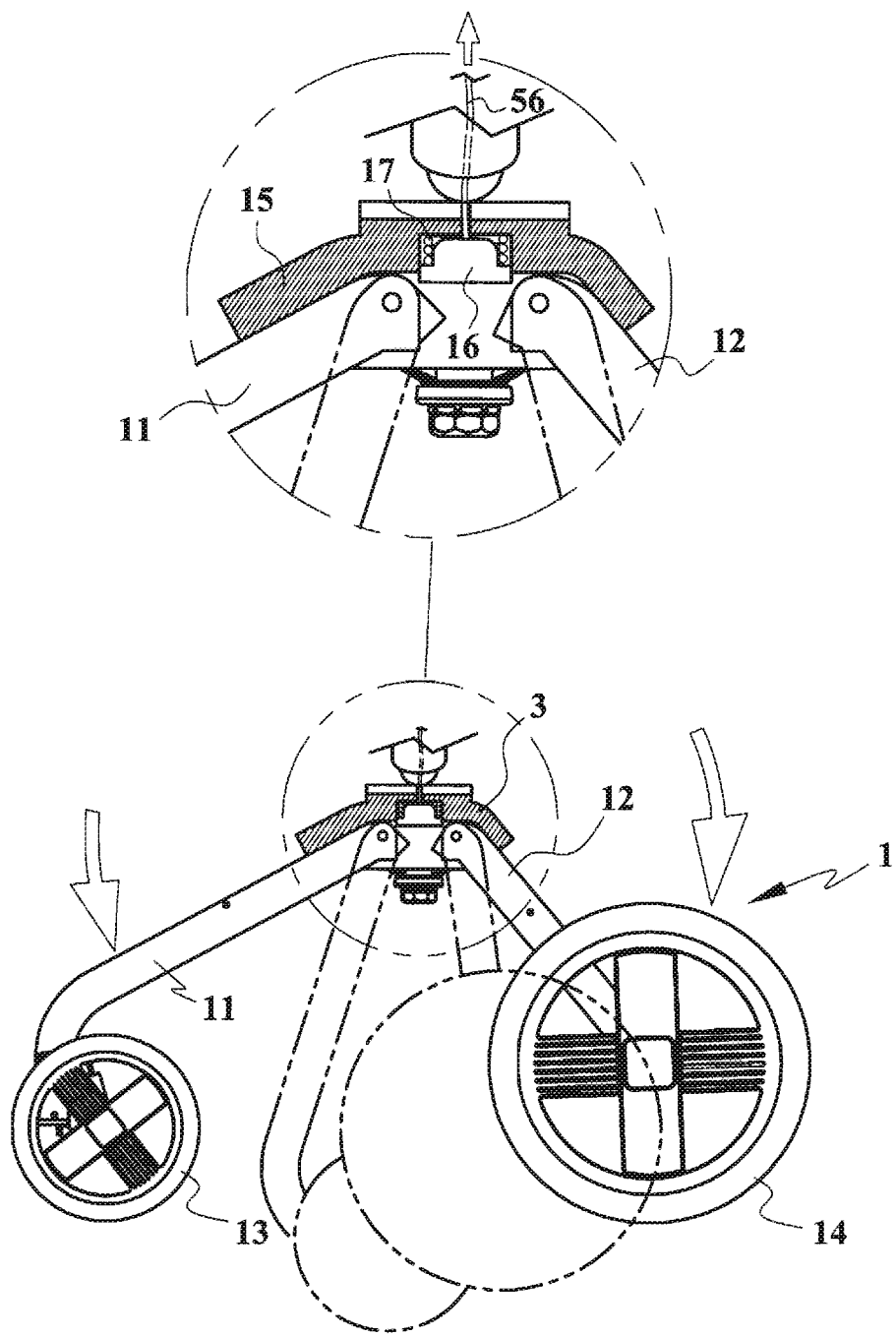
FIG. 15 is a partial cross-sectional view schematically illustrating the operation of the folding of the collapsible wheeled frame.

The release mechanism 5 is operatably mounted on the foldable upper frame 10 for releasing the front strut 11 and the rear struts 12 from the using configuration by pulling the abutting slider 16 against the biasing of the resilient member 17. As illustrated in FIG. 15, when the abutting slider 16 is pulled to leave the rotation path of the front strut 11 and the rear struts 12, the front strut 11 and the rear struts 12 is permitted to rotate relative to each other, and ultimately, folded into a folded configuration.

Figure 16:
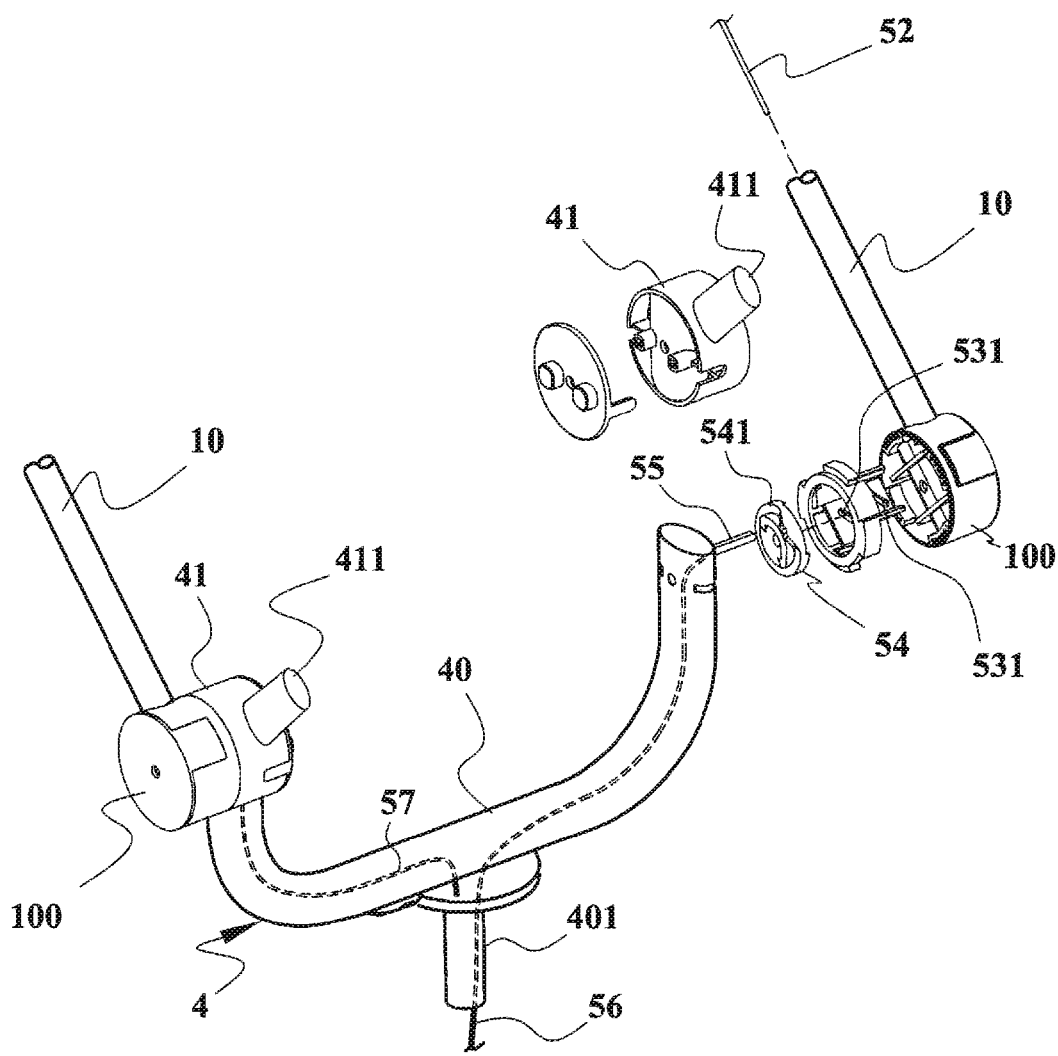
FIG. 16 is an exploded view of the swivel rack and the release mechanism.

Referring to FIGS. 14 to 16, the release mechanism 5 associates with the abutting slider 16 by the lower flexible connecting member 56. When joints 100 and 101 are unlocked, and the push arms 110 of the foldable upper frame 10 is rotated downwardly, the release mechanism 5 drives the lower flexible connecting member 56 to pull the abutting slider 16, to actuate the folding of the collapsible wheeled frame 1.

Figure 17:
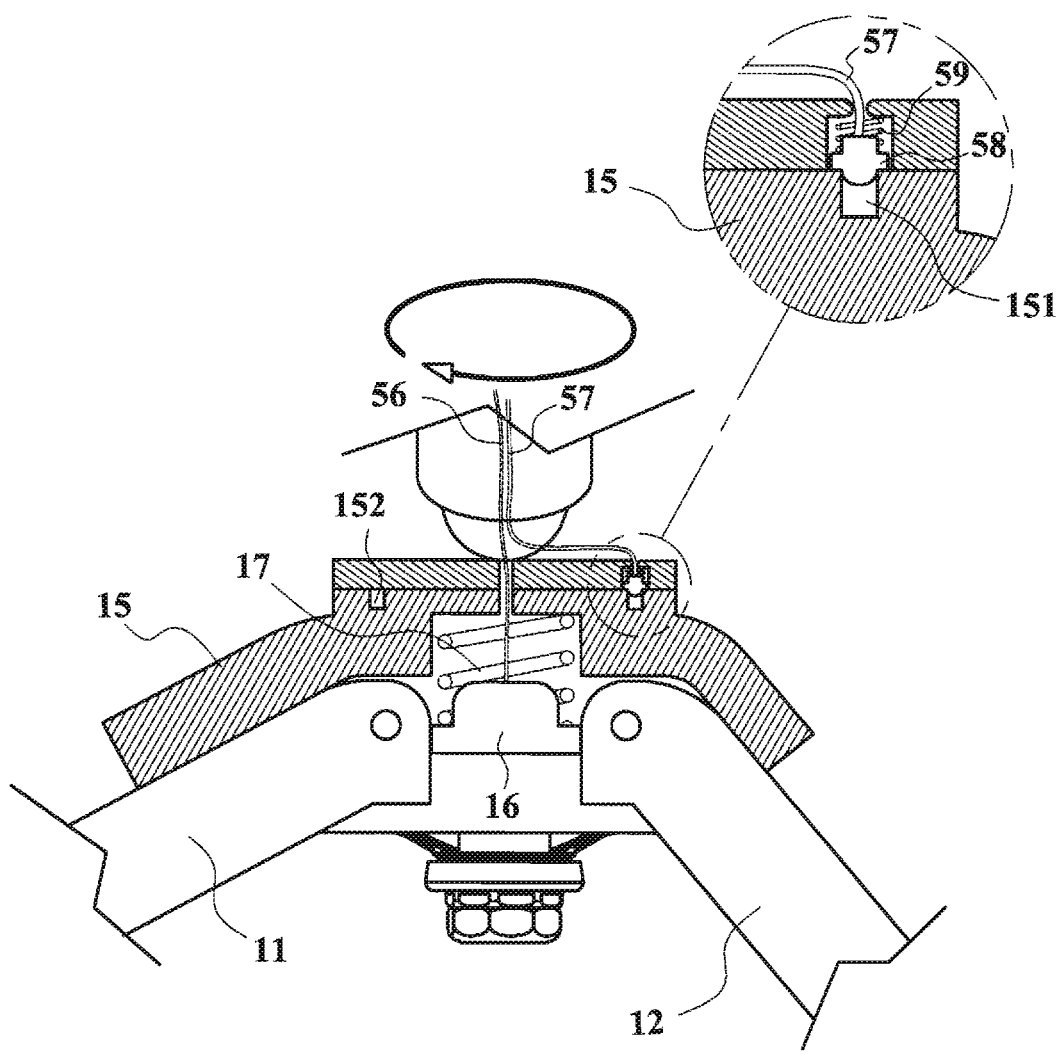
FIG. 17 is a partial cross-sectional view illustrating an alternative embodiment of the assembly of the lockable swivel base and the swivel rack.

Referring to FIGS. 16 and 17, a positioning member 58 is operatively mounted in the lower end of the swivel rack 4 for retractably engaging with the lockable swivel base 15 thereby to fix the direction of the foldable upper frame 10. A resilient member 59 biased against the positioning member 58 to engage with the lockable swivel base 15.

Preferably, the lockable swivel base 15 is formed with indents 151 and 152 for engaging with the positioning member 58 for fixing the direction of the foldable upper frame 10.

Figure 18:
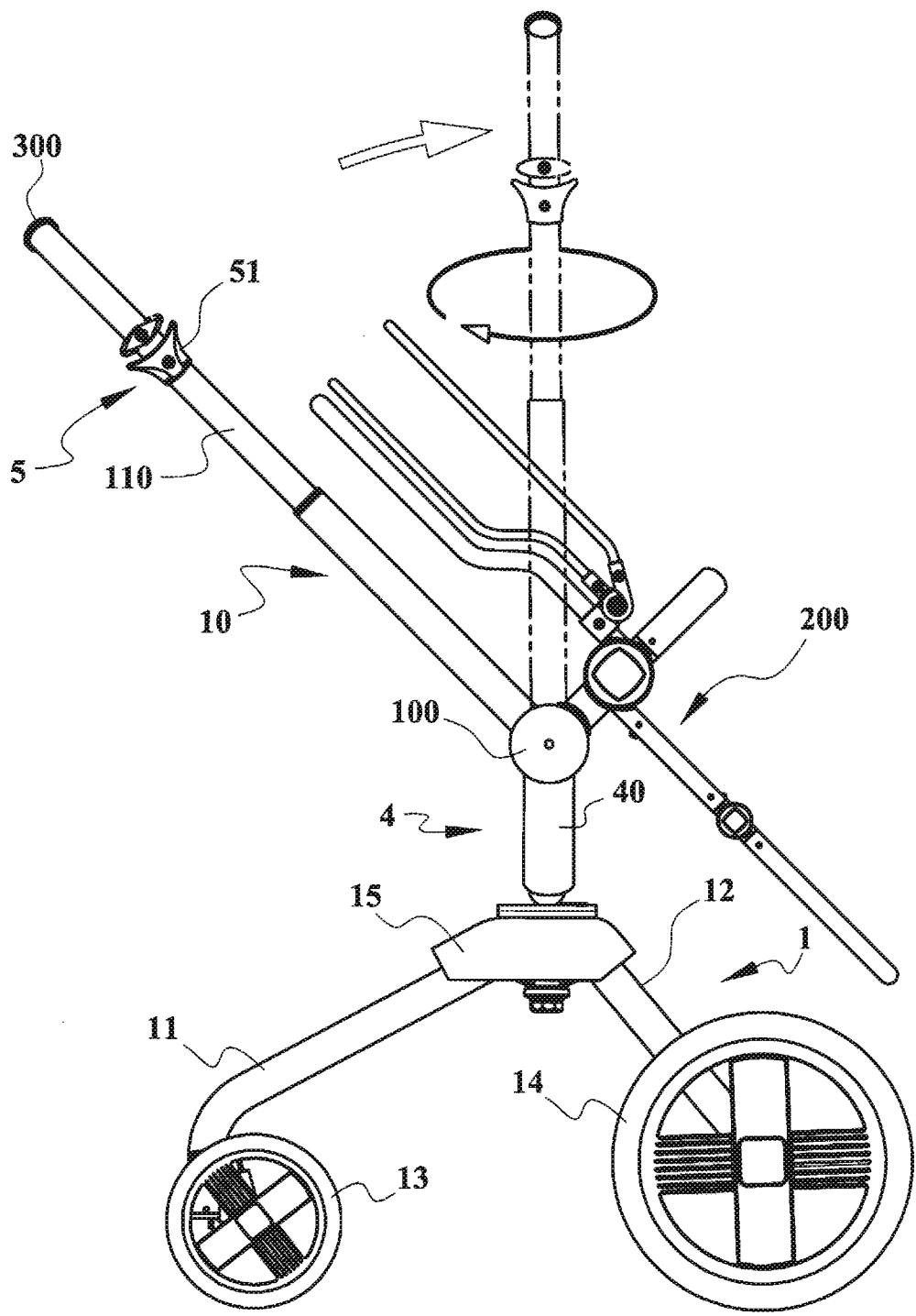
FIG. 18 is a side view schematically illustrating the operation for changing the direction of the swivel rack.

Referring to FIG. 18, the release mechanism 5 may comprise a third connecting member 57 associated with the positioning member 58. When joints 100 and 101 are unlocked, and the push arms 110 of the foldable upper frame 10 is rotated upwardly to a upright position, the release mechanism 5 drives the third connecting member 57 to pull the positioning member 58, to disengage the positioning member 58 form the lockable swivel base 15.

While the invention has been described by way of example and in terms of preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A foldable baby stroller frame, comprising:
   a collapsible wheeled frame, having at least a front strut, a pair of rear struts, and
   a lockable swivel base having a vertical shaft hole and being pivotally connected with the front strut and the rear struts; the lockable swivel base including an abutting slider biased by a resilient member for fixing the front strut and the rear struts in a using configuration;
   a foldable upper frame being pivotally connected with and supported by the lockable swivel base, and comprising a swivel rack having an U-shaped arm with two distal ends and a vertical shaft pivotally inserted and connected in the vertical shaft hole, a push arm for pushing the baby stroller frame, and a joint lockably connected between the swivel rack and the push arm; and
   a release mechanism operatably mounted on the foldable upper frame for releasing the front strut and the rear struts from the using configuration to a folded configuration.

2. The foldable baby stroller frame of claim 1, wherein the abutting slider is associated with the release mechanism through a lower flexible connecting member.

3. The foldable baby stroller frame of claim 1, wherein the foldable upper frame further comprises a pair of mounts connected with the distal ends of the U-shaped arm for detachably supporting a seat supporting frame.

4. The foldable baby stroller frame of claim 3, wherein the mounts each have a connecting member, and the seat supporting frame has a pair of sockets for detachable engagement with the connecting member.

5. The foldable baby stroller frame of claim 3, wherein the foldable upper frame further comprises a pair of mounts connected with the distal ends of the U-shaped arm for detachably supporting a baby carrier.

6. The foldable baby stroller frame of claim 5, wherein each of the mounts has a connecting member, and the seat supporting frame has a pair of sockets for detachably engaging with the connecting member.

7. A foldable baby stroller frame, comprising:
   a collapsible wheeled frame, having at least a front strut, a pair of rear struts, and
   a lockable swivel base pivotally connected with the front strut and the rear struts; the lockable swivel base including an abutting slider biased by a resilient member for fixing the front strut and the rear struts in a using configuration;
   a foldable upper frame pivotally connected to and supported by the lockable swivel base; and a release mechanism operatably mounted on the foldable upper frame for releasing the front strut and the rear struts from the using configuration to a folded configuration, wherein the release mechanism comprises:

a slidable driving member release actuator movably mounted to the foldable upper frame;

a driving member slidably having a skewed guiding slot;

an upper flexible connecting member having a lower end slidably engaged within the skewed guiding slot and an upper end connected with the release actuator;

a resilient member for biasing and keeping the driving member in a locked position; and the foldable upper frame comprises:

a swivel rack having an U-shaped arm with two distal ends and a vertical shaft pivotally supported and connected with the collapsible wheeled frame;

a pair of mounts, each having a connecting member and an inner periphery formed with a plurality of positioning slots for slidably engaging with the driving member;

a pair of joints, each pivotally coupled with one of the pair of mounts and formed with a space for receiving the resilient member and the driving member; and a push arm having two ends connected with the pair of joints for lockably pivoting about the pair of mounts.

8. The foldable baby stroller frame of claim 7, wherein the driving member is engaged with the plurality of positioning slots in the locked position so as to lock the pair of joints.

9. The foldable baby stroller frame of claim 8, wherein the pair of joints is unlocked by pulling the upper flexible connecting member upwardly, thereby forcing the driving member to move against the biasing of the resilient member and disengage from the plurality of positioning slots.

10. The foldable baby stroller frame of claim 8, wherein the release mechanism further comprises:

a driven member having a ramp formed on one side thereof and retractably engaged with the driving member and driven by the driving member to rotate while the pair of joints are unlocked;

a slider biasing by a resilient member and having one end for slidably abutting on the ramp of the driven member; and a lower flexible connecting member having an upper end connected with the slider, and a lower end for associating with the pair of lockable articulated arms.

11. The foldable baby stroller frame of claim 10, wherein the slider is driven by the ramp while the pair of joint is unlocked and the driven member is rotated by the driving member, thereby to pull up the lower flexible connecting member upwardly.

12. The foldable baby stroller frame of claim 10, wherein the pair of lockable swivel base 15 is unlocked by rotating the push arm downward while the pair of joint is unlocked by moving the slidable driving member.

13. The foldable baby stroller frame of claim 7, further comprises a positioning member operatively mounted in the lower end of the swivel rack for retractably engaging with the lockable swivel base to fix the direction of the foldable upper frame;

a resilient member biased against the positioning member to engage with the lockable swivel base; and a third connecting member associated between the positioning member and the release mechanism.

14. The foldable baby stroller frame of claim 13, wherein the lockable swivel base has at least one indent for engaging with the positioning member for fixing the direction of the foldable upper frame.

15. The foldable baby stroller frame of claim 13, wherein the release mechanism is manipulated by rotating a pair of push arms of the foldable upper frame.

16. The foldable baby stroller frame of claim 15, wherein the positioning member is disengaged with the swivel rack when the pair of push arms are rotated upwardly to a upright position to permit the foldable upper frame to change the direction thereof.

17. The foldable baby stroller frame of claim 15, wherein the abutting slider is pulled by the lower flexible connecting member to allow the front strut and the pair of rear struts rotating to rotate relative to each other, when the pair of push arms are rotated downwardly.

* * * * *